US011151153B2

(12) United States Patent
Aboutaam

(10) Patent No.: US 11,151,153 B2
(45) Date of Patent: Oct. 19, 2021

(54) OBJECT GENERATION

(71) Applicant: Biliana Kirilova Aboutaam, Geneva (CH)

(72) Inventor: Biliana Kirilova Aboutaam, Geneva (CH)

(*) Notice: Subject to any disclaimer, the term of this patent is extended or adjusted under 35 U.S.C. 154(b) by 215 days.

(21) Appl. No.: 16/205,384

(22) Filed: Nov. 30, 2018

(65) Prior Publication Data

US 2019/0163685 A1 May 30, 2019

Related U.S. Application Data

(60) Provisional application No. 62/592,954, filed on Nov. 30, 2017.

(51) Int. Cl.
*G06F 16/20* (2019.01)
*G06F 16/25* (2019.01)
*G06T 17/00* (2006.01)
*G06F 21/60* (2013.01)

(52) U.S. Cl.
CPC .......... *G06F 16/258* (2019.01); *G06F 21/602* (2013.01); *G06T 17/00* (2013.01); *G06F 2221/2107* (2013.01); *G06T 2210/32* (2013.01)

(58) Field of Classification Search
CPC ................ G06F 21/602; G06F 16/258; G06F 2221/2107; G06T 17/00; G06T 2210/32
See application file for complete search history.

(56) References Cited

U.S. PATENT DOCUMENTS

| 8,339,619 B2 * | 12/2012 | Misawa | G06K 9/00442 358/1.13 |
| 9,648,297 B1 * | 5/2017 | Ettinger | G06T 7/50 |
| 10,672,180 B2 * | 6/2020 | Jeong | G06T 15/20 |
| 2006/0197768 A1 * | 9/2006 | Van Hook | G09G 5/363 345/546 |
| 2010/0111429 A1 * | 5/2010 | Wang | H04N 5/77 382/233 |

(Continued)

OTHER PUBLICATIONS

Desai, K. (May 17, 2017). "Build a Visualization and Monitoring Dashboard for IoT Data with Amazon Kinesis Analytics and Amazon QuickSight" located at https://aws.amazon.com/blogs/big-data/build-a-visualization-and-monitoring-dashboard-for-iot-data-with-amazon-kinesis-analytics-and-amazon-quicksight/ [retrieved on Jan. 18, 2019, 15 pages.

(Continued)

*Primary Examiner* — Tarek Chbouki
(74) *Attorney, Agent, or Firm* — Mintz Levin Cohn Ferris Glovsky and Popeo, P.C.

(57) ABSTRACT

A system, a method, and a computer program product for generation of an object. A data input is received. The data input is converted into a digital object format. The converted data input includes a mapping indicative of an organization of a plurality of data points in the data input. The converted data input is processed based on the mapping. The processing includes at least one manipulation of at least one data point in the plurality of data points in the data input. The processed data input is transformed into a digital object mass containing at least one instruction and at least one parameter for generating of the object. A representation of the object in a predetermined format is generated based on the transformed processed data.

15 Claims, 17 Drawing Sheets

(56) References Cited

U.S. PATENT DOCUMENTS

| | | | | |
|---|---|---|---|---|
| 2013/0268545 | A1* | 10/2013 | Burchett | G06F 16/986 |
| | | | | 707/754 |
| 2014/0006244 | A1* | 1/2014 | Crowley | G06Q 40/04 |
| | | | | 705/37 |
| 2017/0180413 | A1* | 6/2017 | Petry | H04L 63/0209 |
| 2017/0206523 | A1* | 7/2017 | Goeringer | G06Q 20/409 |
| 2017/0230352 | A1* | 8/2017 | Chen | H04L 63/061 |
| 2018/0165466 | A1* | 6/2018 | Rad | H04N 19/60 |

OTHER PUBLICATIONS

Dial, J. (Feb. 22, 2017). "Contents Contents" located at https://docs.microsoft.com/en-us/azure /opbuildpdf/network-watcher/toc.pdf?branch =live, retrieved on Jan. 17, 2019, pp. 155-159.
International Search Report dated Jan. 31, 2019, for PCT Application No. PCT/IB2018/059529, filed Nov. 30, 2018, 5 pages.
Written Opinion dated Jan. 31, 2019, for PCT Application No. PCT/IB2018/059529, filed Nov. 30, 2018, 8 pages.

* cited by examiner

OBJECT GENERATION

CROSS-REFERENCE TO RELATED APPLICATIONS

The present application claims priority to U.S. Provisional Patent Appl. No. 62/592,954 to Biliana K. Voden Aboutaam, filed Nov. 30, 2017, and entitled "Object Generation", and incorporates its disclosure herein by reference in its entirety.

TECHNICAL FIELD

This disclosure relates generally to data processing and, in particular, to data processing and, in particular, to conversion or quantification of data into one or more virtual and/or physical form.

BACKGROUND

Data transformation refers to conversion of data from one format and/or structure into another format and/or structure. Data transformation processes can be part of data integration and/or data management tasks, e.g., data wrangling, warehousing, integration and application integration. Data transformation can be simple or complex. Complexity of data transformation processes can depend on the type of changes that may be required to transform the original or source data into the final or target data. Data can be transformed using manual and/or automated steps. Tools, technologies, etc. used in this process can depend on format, structure, complexity, and/or volume of the data being transformed.

There is a need for a computing system that is capable of transforming data, regardless of the data origin, format, volume, complexity, structure, etc. into a particular format that can be used to generate a desired object (e.g., an art form, a sculpture, an architectural design, etc.).

SUMMARY

In some implementations, the current subject matter relates to a computer-implemented method for generating of an object. The method can include receiving a data input, converting the data input into a digital object format, wherein the converted data input includes a mapping indicative of an organization of a plurality of data points in the data input, processing the converted data input based on the mapping, wherein the processing includes at least one manipulation of at least one data point in the plurality of data points in the data input, transforming the processed data input into a digital object mass containing at least one instruction and at least one parameter for generating of the object, and generating a representation of the object in a predetermined format based on the transformed processed data.

In some implementations, the current subject matter can include one or more of the following optional features. The data input can include at least one of the following: an image, a video, an audio file, a text file, an input command, a query, a function call, data obtained from the Internet of Things (IoT), sensor data, and any combination thereof.

In some implementations the method can also include scrambling the received data input, encrypting the received data input, and storing the encrypted scrambled data input in at least one cloud storage location. The converted data input and the mapping can be stored in the at least one cloud storage location. At least one token can be assigned to at least one portion of the converted data input, the token being indicative of a size of the at least one portion of the converted data input. At least one data point can correspond to a point cloud in the plurality of point clouds. The manipulation of at least one point cloud in the plurality of point clouds can includes at least one of the following: selection, transporting, transforming, deletion, purging, replacement, etc. of the at least one point cloud and any combination thereof.

In some implementations, the predetermined format of the object can include at least one of the following: a 3D printer format, 3D milling format, a projector format, a virtual/augmented reality device format, a video game format, and any combination thereof. The object can include at least one of the following: a physical object, a virtual object, and any combination thereof.

In some implementations, the cloud storage location can store at least one blockchain ledger configured to include a correlation of the received data input, the converted data input, the processed data input and the mapping, the at least one instruction and at least one parameter for generating of the object, and the generated representation of the object.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
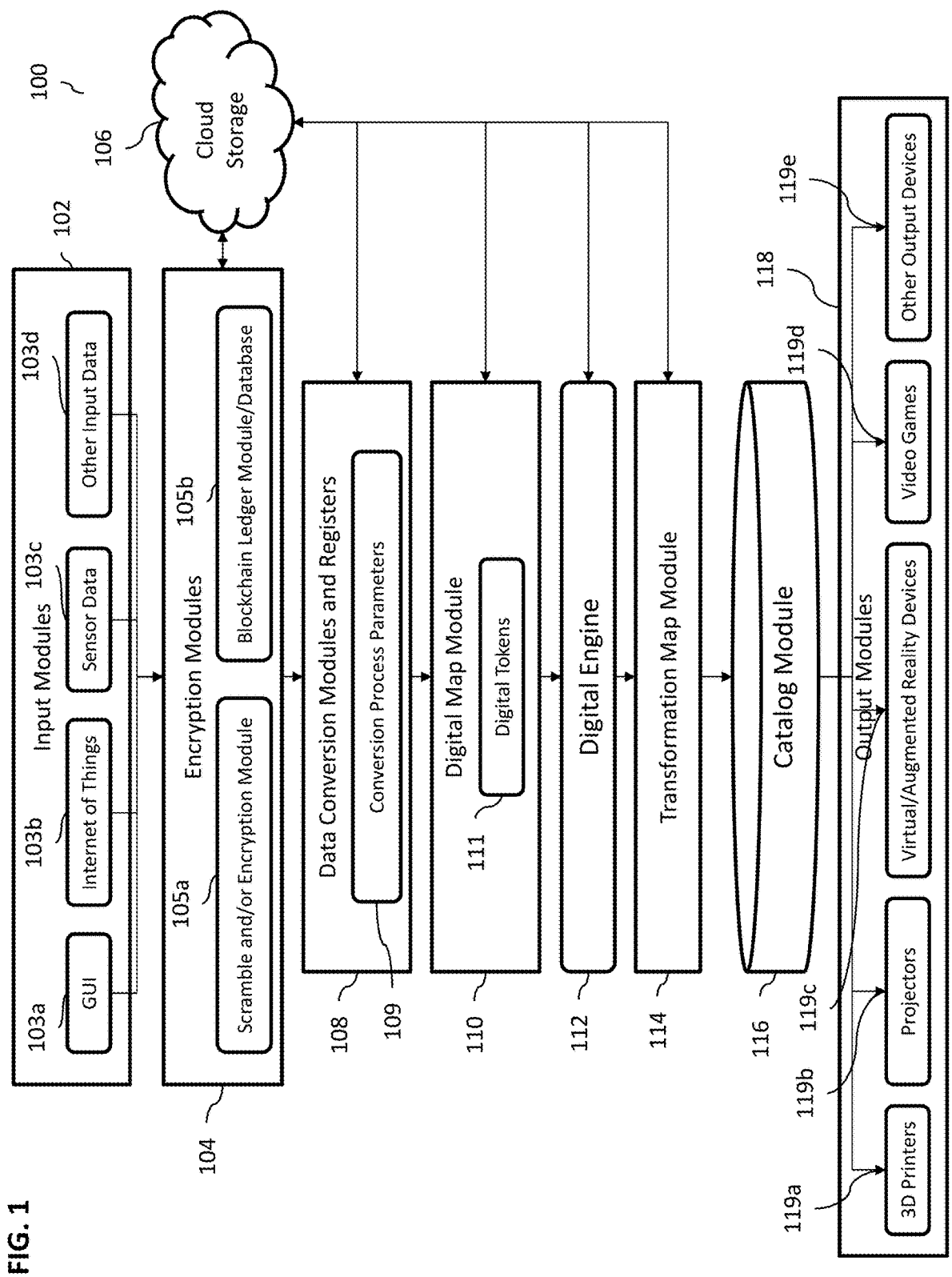
FIG. 1 illustrates an exemplary digital object generation system, according to some implementations of the current subject matter.

In some implementations, the current subject matter relates to a digital object generation system that is capable of receiving an input of any data, processing such input, and generation digital object(s) and/or a physical object(s) and/or any other object(s). In some implementations, the current subject matter can provide for a way to quantify digital data by assigning "mass" to it, and, hence a certain amount of energy, which can be used to manifest one or more virtual and/or physical objects.

In some implementations, the current subject matter relates to a method for generation or creating an object (e.g., a physical object, a virtual object, an art form, and/or any other form) using modern digital tools and processes. In some implementations, the current subject matter can integrate into data a sense of human emotion and an element of a unique moment in time by capturing specific individual and/or environment-specific data that can then be used as an input to further create and/or customize the final artistic output.

In some implementations, the current subject matter can be configured to increase movement and/or transfer and/or transition and/or transformation of data and/or any other information from traditional sources such as pen, paper, paint, photographs, film, etc. into a digital format, such as, scanned images, binary numeric formats, digital audio, video, and/or any other formats, and/or any combination thereof. In addition, the current subject matter can be configured to source information from the Internet of Things (IoT) that has created a vast infrastructure of interconnected devices that can permeate modern day-to-day life in most societies and can generate a vast stream of continuous data and/or information that can reflect specific environmental and/or human conditions that can exist at any moment in time, such as, when an artwork and/or an "art experience" takes place (an/or any object creation occurs). The current subject matter can be configured to not only to create objects (physical and/or virtual), digital artworks, etc. but, can also capture, refine, perfect and/or preserve a specific 'art experiences' and/or object experience that can take place over time.

In some implementations, the current subject matter can allow a user (e.g., an artist, an engineer, a computer programmer, a software application, a machine, and/or any other being and/or thing) to take various digital sources as described herein and convert those sources into a single digital art format (DAF) or digital object format (DOF) using one or more data transformation software modules. These individual software modules can convert each individual format into the DAF/DOF. The current subject matter can incorporate the DAF/DOF and the software conversion modules and/or any other components.

In some implementations, the input stage of the current subject matter's process can include an ability to acquire and/or integrate sensory and/or environmental information for inclusion into the artistic process and/or object generation/creation process. Using sources from the IoT environmental information such as time of day, date, ambient temperature, pressure, ambient light, characteristics of an object, data, etc. can be captured and/or included as part of a data set. The user can also be communicatively coupled to and/or be associated (e.g., wear) individual sensors that can capture human specific information such as heart rate, body temperature, breath rate, and brain waves to be included in the DAF/DOF data set as well. If the object is intended to be participatory such as the case with augmented reality, art/object data can be collected and/or included from sensors that can collect individual human experiential and/or emotional data and/or any other characteristics of objects.

In some implementations, the current subject matter can include a digital art engine (DAE) and/or digital object engine (DOE) that can process these digital art/object files to generate/create a preliminary output file in the DAF/DOF, which can be referred to as a "digital mass". It is important to note that the digital mass can be an integrated result of both static and/or event specific data. The inclusion of this event specific and/or human emotional and/or experiential data can be important as it can integrate emotional and/or moment-specific dimensions and/or any other characteristics into the final product. Hence, running the process with the same "static" data set that, for example, might represent a picture and/or a sculpture multiple times can yield different results as the environmental and/or human factors can inevitably change based on the changed environmental factors and/or inherent variations in human emotions and/or other parameters.

In some implementations, the new output file can now represent a transformed work of art/object, in the digital art format and/or digital object format. This file can then be processed further by separate computing components (e.g., software modules) to convert the transformed artwork/object to formats that can be represented in more conventional digital formats such as digital images (GIF, JPEG, PNG files, etc.), 3D printing, a software application, etc.

The final artwork/object can be represented by the object, image, video, audio, or software application that is produced. The final artwork/object can also be a component of an augmented reality application where the total experience can include the artwork itself and/or the experience will be unique once again based on the emotional human factor of the user and/or the a third party (e.g., an art observer) at the same time.

In some implementations, the current subject matter system can also include a digital object creation engine, a format conversion component, a production component, and/or any other components/modules. The digital art creation engine enables the artist to input a variety of parameters that direct the process of artistic creation and data transformation.

In some implementations, the current subject matter can perform one or more of the following functionalities (not necessarily in the order listed).

Function 1.

In some implementations, the current subject matter can convert any input data in any format into a digital art format (DAF) and/or a digital object format (or any other format, e.g., physical, virtual, etc.) and can include environmental, emotional, experiential, physical, digital, audio, video, text, etc. data and/or any combination thereof into the data set. One or more of the current subject matter's software modules can be configured to perform such conversion. Collection of environmental, emotional, experiential, physical, digital, audio, video, text, etc. data and/or any combination thereof can be performed using one or more sensors, processors, etc., which can be configured to communicatively couple with the Internet of Things to integrate streaming data that may be available. This experiential data can also be converted to the DAF/DOF to create a digital mass.

In some implementations, function 1 can also include storage and/or protection of data as well as inclusion of various artifacts associated with data (e.g., inclusion of an artist specific signature to indicate ownership of the data, etc.). Data, artifacts, etc. can be stored in one or more data storage locations, memory locations, databases, cloud servers, etc.

Function 2.

In some implementations, the current subject matter can also perform creation of an object (e.g., an art object, a virtual object, a physical object, etc., and/or any combination thereof). In some implementations, the current subject matter's digital object engine component can be applied to the generated digital mass to generate an individual object-work (e.g., artwork) dataset. In some implementations, this can be an automatic process that can implement an object/art engine algorithm. The generated dataset can be referred to as the digital object/art mass.

Function 3.

The current subject matter's individual artistic function can enable the user to override the autonomous and automated mode of the digital object/art engine. The user can modify the digital object/art mass by modifying specific parameters that govern the functioning of the digital object/art engine. In some implementations, this can enable the user to change the 'turn the dials' and change the settings of the digital object/art engine to levels that the user is most comfortable with.

Function 4.

The current subject matter can grant a full control to the user over the digital object/art mass and can allow the user to initiate a process of transformation based on first-hand engagement (on a fundamental digital particle level) with the digital object/art mass. In some implementations, automated support functions can be provided to support a manual mode in the case of a large and complex digital object/art mass. However, when complete, a digital object/art mass can be at least 51% of the creation of the user as a result of providing the datasets and manual modification of the digital object/art mass via the individual user functions and the object/art algorithm anomaly functions to be considered the user's creation rather than an automatically created artwork.

In some implementations, digital mass with higher percentage of manual transformation (new digital particles—x) can be more unique. In the case of large and complex digital art mass, the process can be assisted using artificial intelligence, which can account for the 49% automated support.

Function 5.

The current subject matter can automatically store and protect the digital object/art mass once the manual transformation mode has been completed by the user. At this stage, the various artifacts (e.g., digital signature of the artist) can be included.

Function 6.

The current subject matter can perform exporting of the digital object/art mass for final production, distribution, delivery, etc. Various software modules can convert the digital object/art mass into various recognized end state formats such as images, video, augmented reality, virtual reality, 3D rendering, 3D modeling, 3D printing, 3D milling, software application format(s), digital format, physical format, and/or any other formats and/or any combination thereof. For example, the generated artwork can be created and/or distributed as needed by the artist and/or owners of the art independent of the data.

FIG. 1 illustrates an exemplary object generation system 100, according to some implementations of the current subject matter. The system 100 can be implemented using one or more computing systems having at least one processor and/or at least one memory communicatively coupled to the processor. The system 100 can be implemented using hardware, software, and/or any combination thereof. Further, the system 100 can be implemented in one or more of the following: a smartphone, a tablet, a personal computer, a laptop, a virtual reality device, an augmented reality device, and/or any other type of device and/or any combination thereof. The system 100 can be communicatively coupled to one or more servers, one or more databases, and/or any other systems, components, etc. using wired, wireless, and/or any other type of network.

The system 100 can include one or more processing components, memory components, servers, cloud servers, cloud storage locations, and/or any combination of hardware and/or software. The components of the system 100 can be communicatively coupled with one another using any type of wired and/or wireless connection (e.g., metropolitan area network (MAN), local area network (LAN), wide area network (WAN), virtual local area network (VLAN), Wi-Fi, etc.).

The system 100 can include one or more input modules 102, one or more encryption modules 104, one or more data conversion modules and/or registers 108, one or more digital map modules 110, one or more digital engine processors 112, one or more transformation map modules 114, one or more catalog modules 116, and one or more output modules 118. In some implementations, the system 100 can also be communicatively coupled to one or more cloud storage locations and/or components 106. Alternatively, the storage locations 106 can be local memory and/or storage locations, databases, etc. For the illustrative purposes only, the following description will refer to the component 106 as cloud storage 106. However, as can be understood, the current subject matter is not limited to the use of a cloud storage, as stated above.

In some implementations, the cloud storage 106 can be configured to store various data (e.g., encrypted data, scrambled data, token data, conversion parameter data, mapping data, ledger data, etc., and/or any combination thereof) generated by the system 100 during the process of generation of objects. The data stored in the cloud storage 106 can be provided to the system 100 and/or its various components on demand, automatically, manually, etc. The data can be provided to the cloud storage 106 by one or more components 100 in a streaming fashion in real-time (and/or at a predetermined time) and, vice versa, the data stored in the cloud storage 106 can be streamed (e.g., in real-time, at a predetermined time, etc.) to the one or more components of the system 100. The data stored in the cloud storage 106 can be provided to one or more components of the system 100 using various means, such as, upon one or more components of the system 100 generating an appropriate query, a function call, etc. The data can be any type of data, including, but not limited to, images, audio, video, text, object code, source code, graphical data, measurement data (e.g., as obtained from sensors, etc.), digital data, analog data, etc., and/or any combination thereof.

The input modules 102 can be configured to provide input to the system 100 in any possible way. In some exemplary, non-limiting implementations, the input modules 102 can include various graphical user interfaces (GUIs) 103*a* that can be configured to supply data to the system 100. The GUIs 103*a* can provide data in the form of images, videos, audio files, text files, etc., input commands, queries, function calls, etc., and any combination thereof. The input modules 102 can further include inputs from the Internet of Things (IoT) 103*b*. Moreover, input data can be obtained from one or more sensors 103*c*, e.g., sensors measuring temperature, air quality, light intensity, color, quality, etc., audio volume, speed of movement, etc. Any types of sensors can be used as sensors 103*c*. Any other input data devices, terminals, network(s) of devices, servers, components, systems, methods, etc. 103*d* can be used.

In some exemplary, non-limiting implementations, any one or more of the following can serve as an input to the system 100: data that forms an object (e.g., an artwork, which can be obtained from and/or provided by an artist), an environmental data (e.g., which can be obtained from an IoT), human data (e.g., which can be obtained using one or more sensors, wearable devices, computing system, etc.), and/or any other data, and/or any combination thereof. This input data can then be provided one or more computing (e.g., software, hardware, etc.) of the system 100 that can be configured to convert the input data into digital object format (e.g., digital art format in case of a final object being a work of art). The input data can be provided in any desired format. The original format of the data can be recorded. In some implementations, the original input data might not be stored by the system 100 (which can prevent its retrieval/access). A blockchain ledger can be used to record any transformations that occur with the original input data. The original input data along with the blockchain ledger may be provided to the original source of the input data.

In some implementations, data input can have any size and/or any format. By way of a non-limiting example, the data input can be of one or more gigabytes (e.g., megabytes, petabytes, etc.) of any digital data as well as be received in any number of data formats.

Once the input data has been received by the system 100, one or more encryption modules 104 can be configured to scramble and encrypt the input data using scramble/encryption module(s) 105*a*. Any known methods can be used to perform scrambling/encryption of the input data. In some implementations, scrambling/encryption of the input data can be performed in order to protect privacy and/or ownership of the original input data. The details of the ownership of the original data can be hidden from being published. The scrambled/encrypted data can be stored in the cloud storage 106. In some implementations, a blockchain ledger can be used to track and trace the chain of ownership of the scrambled/encrypted data. A blockchain or a blockchain ledger can refer to a growing list of records (e.g., blocks) that can be linked using cryptography, where each block includes a cryptographic hash of the previous block or a timestamp and transaction data. A blockchain ledger module and/or database 105*b* can be configured to generate an appropriate blockchain ledger and continuously update it upon receipt of new input data. In some implementations, a new ledger can be generated for each new input data. Alternatively, all input data received by the system 100 can be kept in the same blockchain ledger. In some implementations, as stated above, once the input data is received by the system 100, it can be converted into a different format, scrambled, encrypted, etc., however, the substantive content of the input data remains unchanged.

The data conversion modules/registers 108 can the convert the input data that has been stored in the cloud storage 106 after it has been encrypted by the encryption module(s) 106 into a predetermined format, e.g., a digital art form (DAF) or digital object form (DOF) (collectively, referred to as DAF in the following description) that is suitable for generation of a particular object (e.g., art object, a sculpture, a jewelry, a non-art object, a vehicle, a building, etc.). The data can be stored and tracked in the cloud storage 106 using the blockchain ledger. In some implementations, the system 100 does not store any data that it receives or transforms, and instead, such data is stored in a remote location and/or in a cloud storage. For example, the data (e.g., input data, encrypted data, etc. and/or any other data that is processed by the system 100) can be streamed to and from the system 100 in real time. In some implementations, the data that has been converted into a DAF format can be assigned a digital "mass". Such digital mass can be used to describe a certain amount of digital data that has been converted into the DAF format. A unit of digital mass can be referred to as a digital mass particle.

Figure 2:
FIG. 2 illustrates an exemplary point cloud representation of data.
Figure 3A:
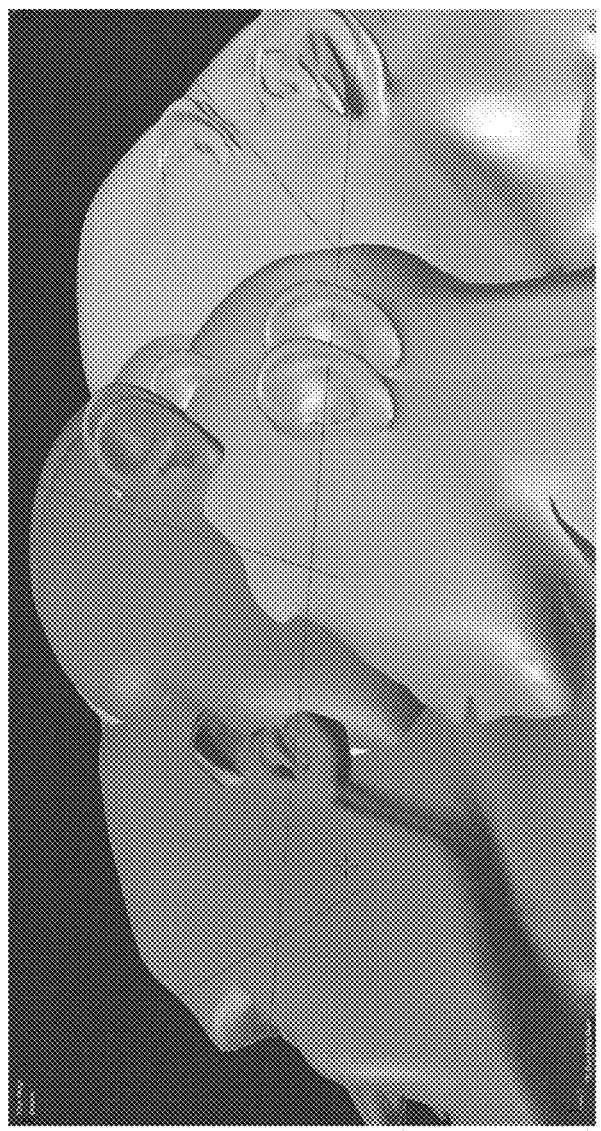
FIGS. 3a-f illustrate resulting representation(s) of the digital art form (DAF) of the point cloud shown in FIG. 2 and exemplary stages of transformation of data as represented by point clouds to generate an object, according to some implementations of the current subject matter.
Figure 3B:
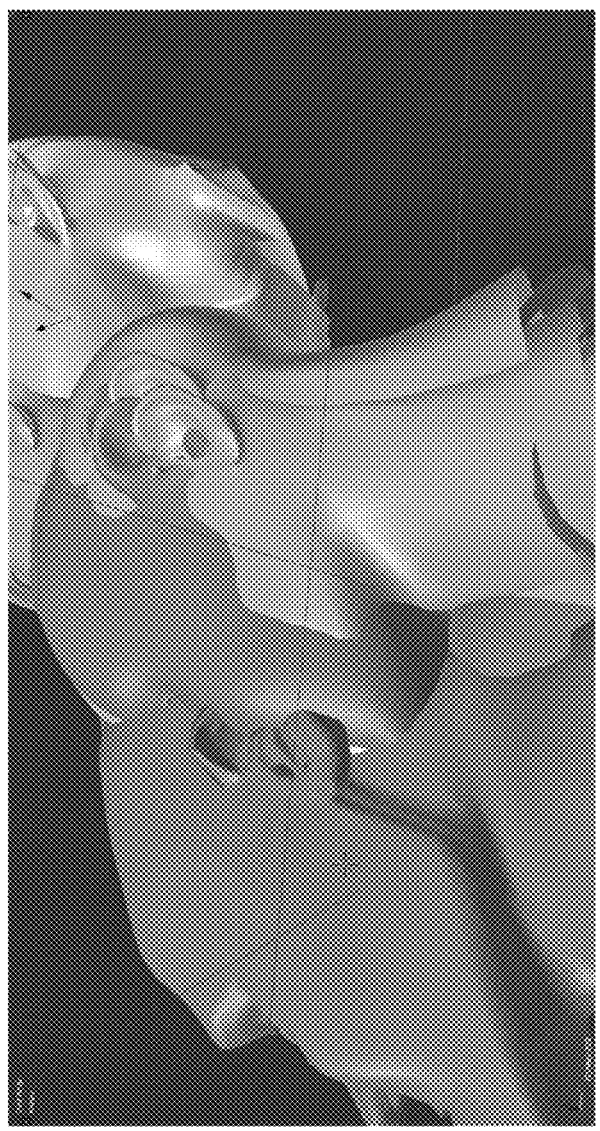
Figure 3C:
Figure 3D:
Figure 3E:
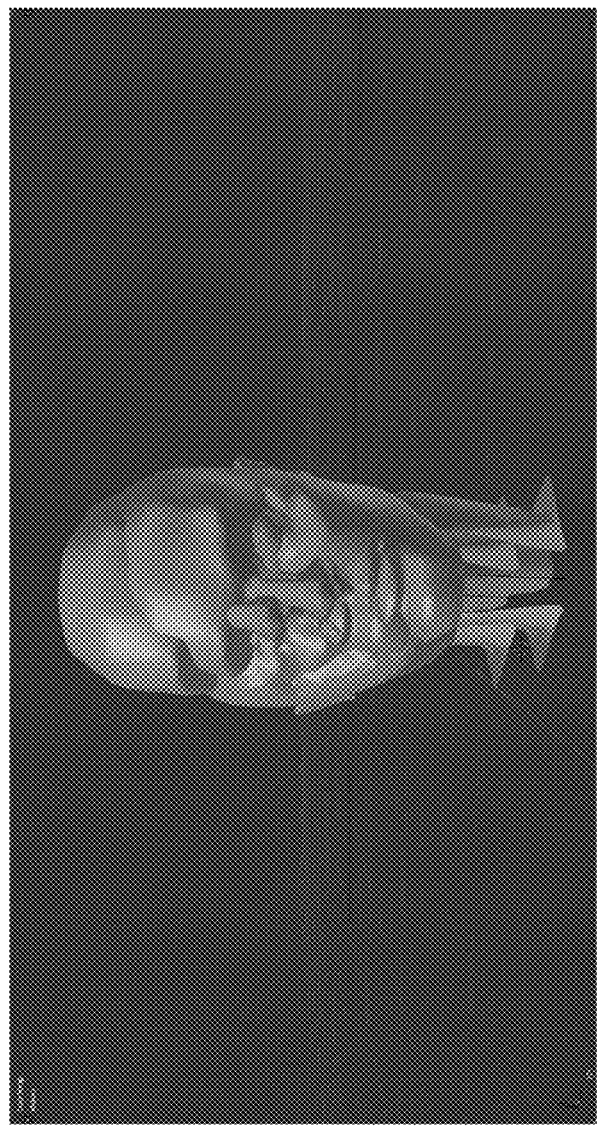
Figure 3F:
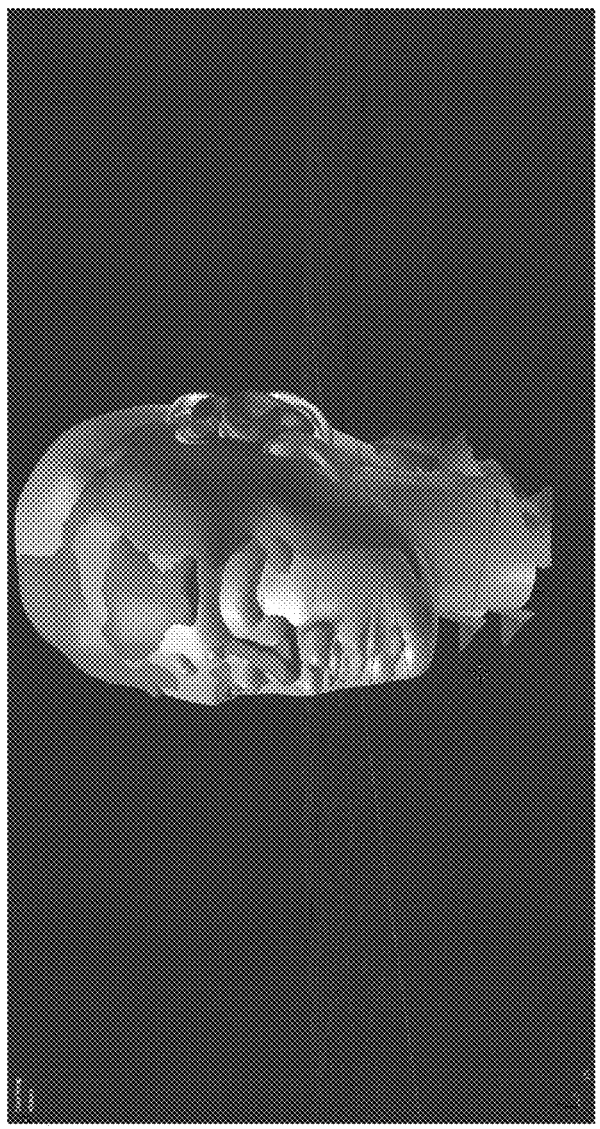
Figure 4A:
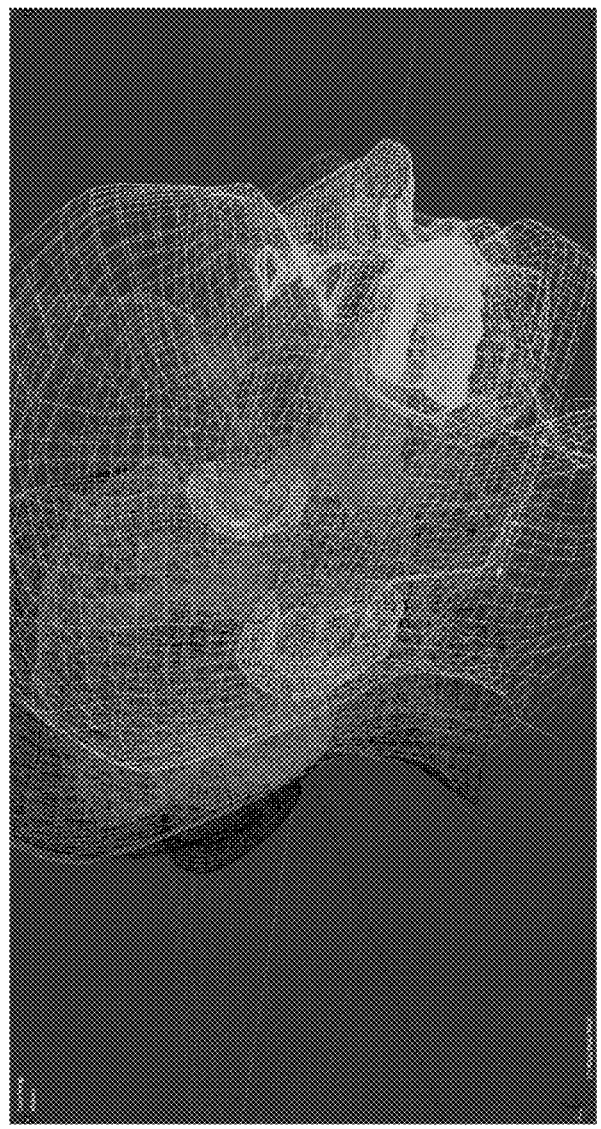
FIGS. 4a-g illustrate some exemplary stages of point cloud transformations to generate the object shown in FIGS. 3a-f, according to some implementations of the current subject matter.
Figure 4B:
Figure 4C:
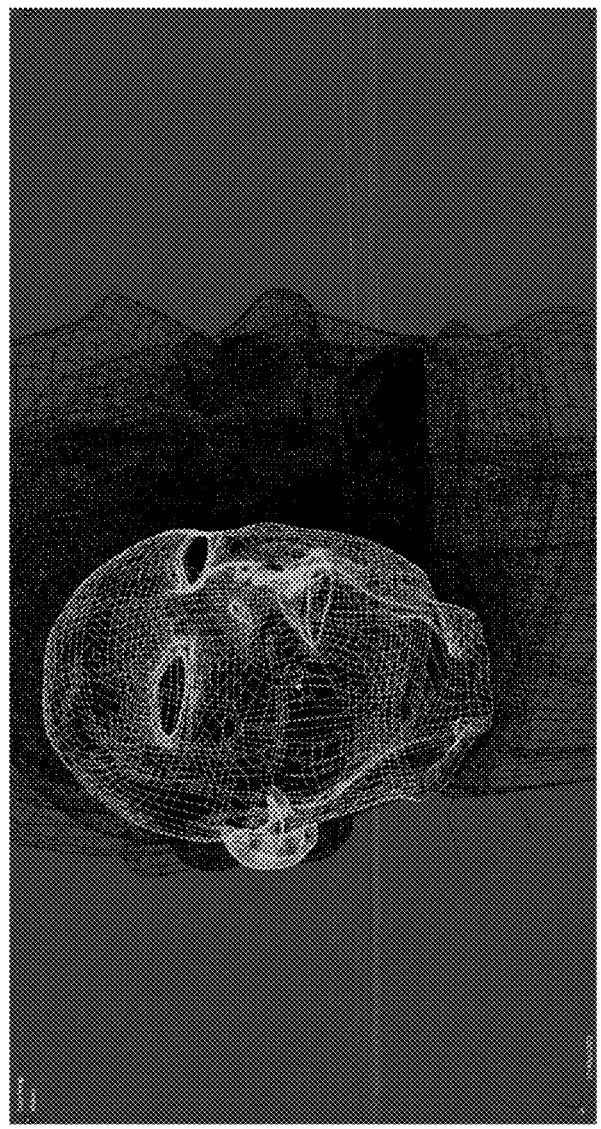
Figure 4D:
Figure 4E:
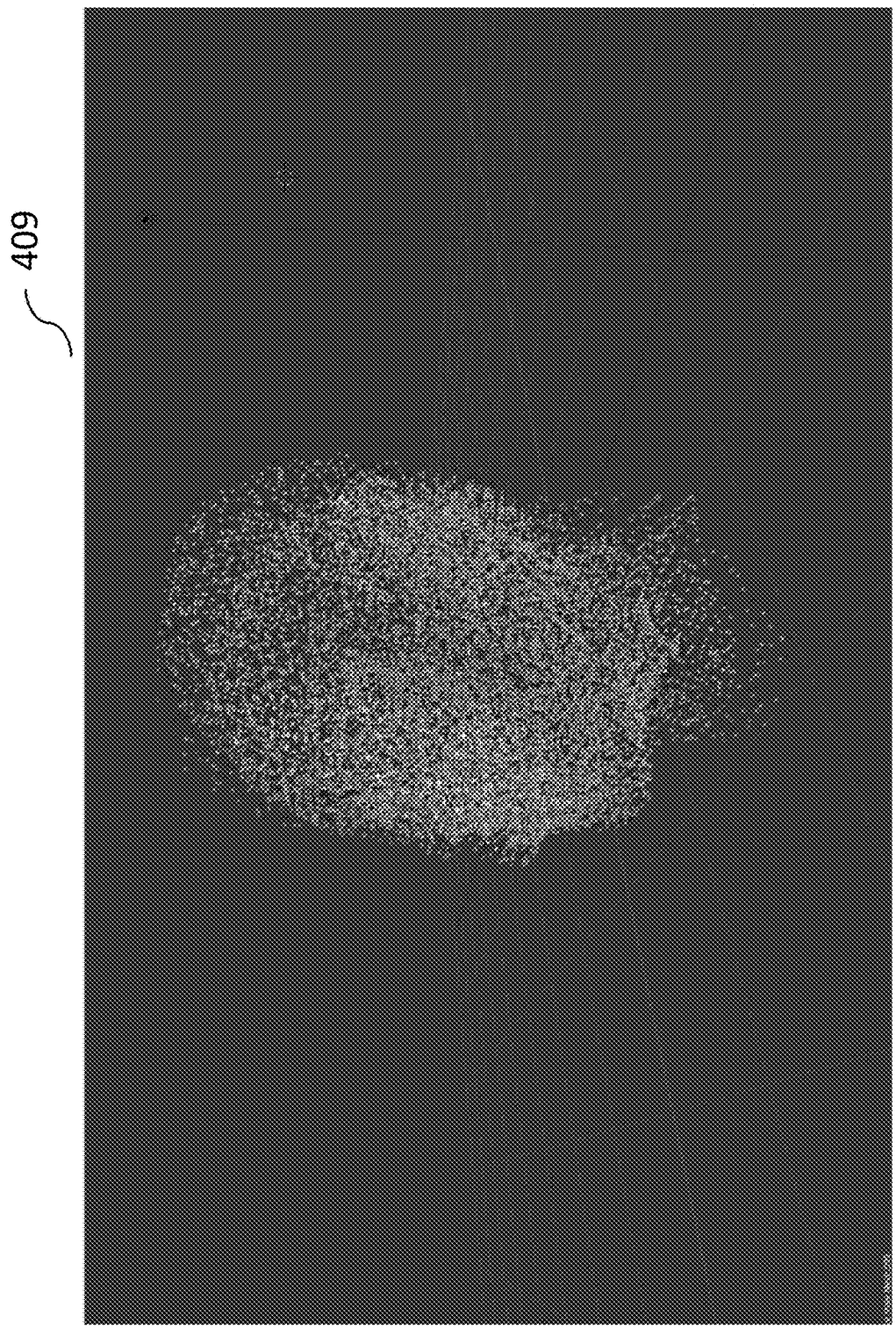
Figure 4F:
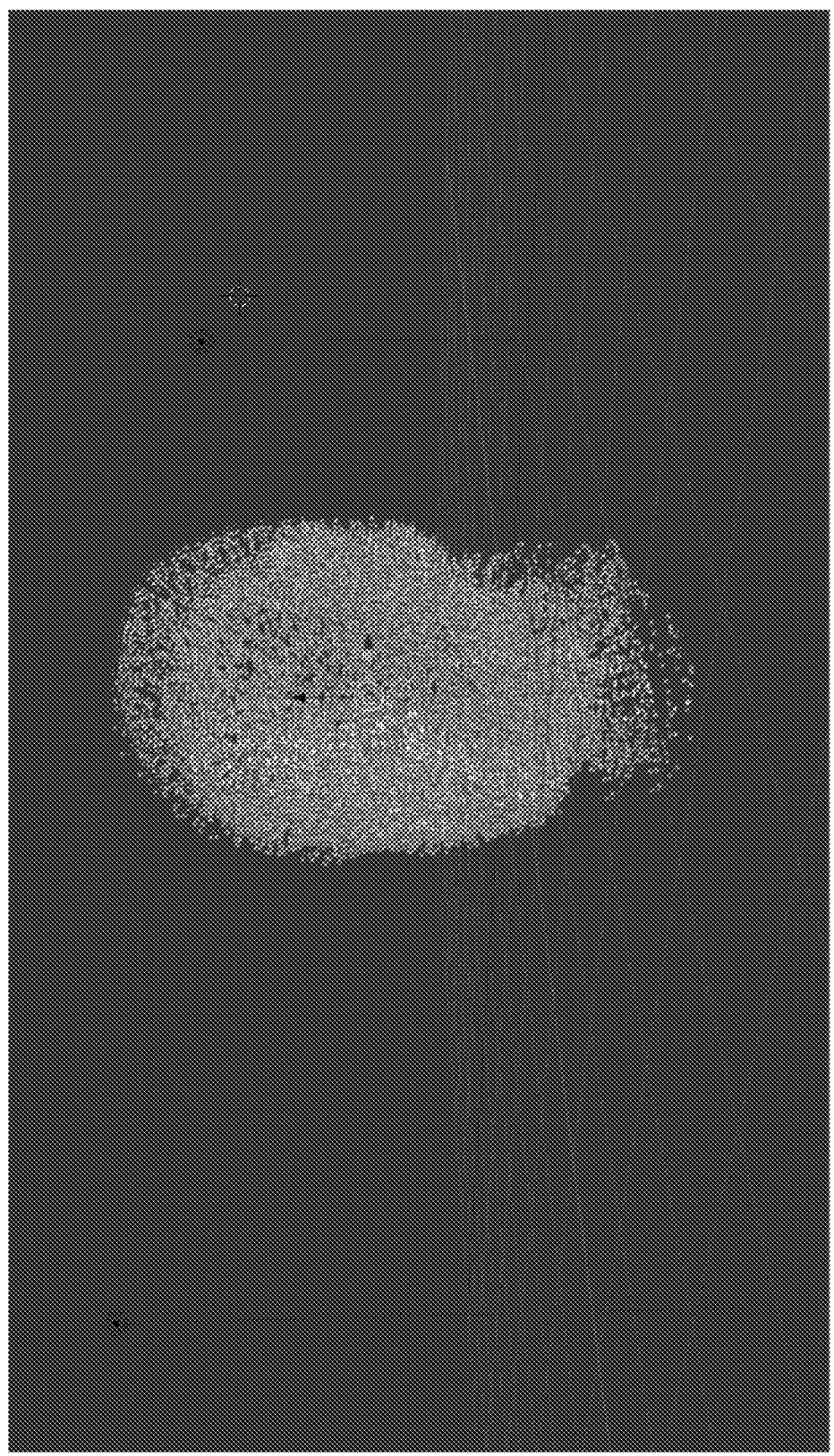
Figure 4G:
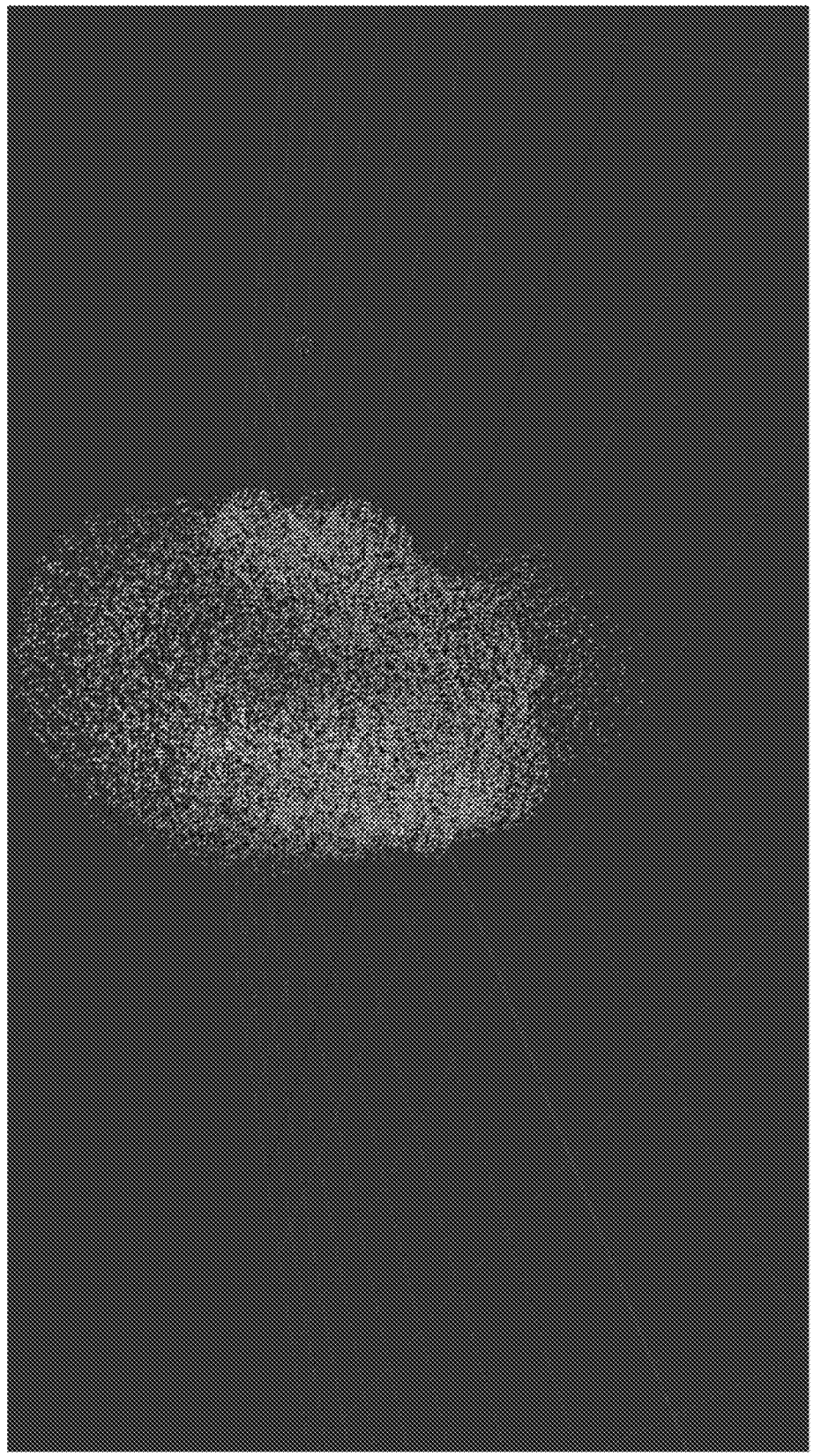

In some exemplary implementations, the input data, once initially processed by the modules 102, 104, can be represented in a random form, e.g., in a dust-like patterns. An exemplary representation 201 of such data is shown in FIG. 2. FIG. 2 illustrates an exemplary point cloud representation of data. A point cloud can be any set of data points in space (can be produced by 3D scanners, which can measure a large number of points on the external surfaces of objects around them). The system 100 can process any point cloud data representation 201 by connecting various points (e.g., as shown in FIG. 2, the input data can originate from the Blender software, i.e., an open-source 3D computer graphics software toolset for creation of animated films, visual effects, art, 3D printed models, interactive 3D applications, video games, etc.). The system 100 can also generate as a result of the encryption and scramble of the original input data, its own exemplary point cloud representation of data in DAF format. A possible resulting representation of the digital art form (DAF) of the point cloud 201 is shown in FIG. 3*a*. In some implementations, data conversion module 108, when converting the data into the DAF format, can use various predetermined conversion process parameters 109, which can determine how the data points are organized. Any resulting data in the DAF or DOF format, referred to as digital mass or digital data mass, can be stored in the cloud storage 106 and/or any other storage/memory location. As stated above, a unit of digital mass can correspond to one digital mass particle. The digital mass particles can be combined together to form a new or another digital mass particle, which can result in generation of a different object than if one digital mass particle is used. The digital mass particle(s) can be configured to be processed by the digital art engine 112 to generate an object (e.g., an art work, a real object, a virtual object, etc.), as discussed below. In some exemplary implementations, a digital mass particle can correspond to a certain amount of data input, e.g., 1 GB of input data can correspond to one digital mass particle. Alternatively, a digital mass particle can correspond to a certain amount of data input that has been processed by the encryption modules 104, data conversion modules 108, and/or digital map module 110. The processed data input can be different (in size) from the raw input received at input modules 102. In further alternate implementations, a "dust" particle or a point in the point cloud, as shown in FIG. 2, can correspond to a single digital mass particle. Each digital mass particle can have a certain "mass" (e.g., expressed in kilo-, mega-, giga-, etc. bytes of data), energy (e.g., expressed in kilo-, mega-, giga-, etc. bytes), and spatial coordinates (e.g., x, y, z, and/or any other coordinates).

Referring back to FIG. 1, the system 100's digital map module can generate a register that can track how the data has been converted and integrated and what parameters have been used to convert and integrate the data by the module 108. As stated above, any data processed by the system 100 can be stored on the cloud storage 106 and tracked using the blockchain ledger. Further, the digital map module 110 can use digital tokens (or digital art tokens (DAT$$) or digital object tokens) to represent a mass/volume/amount of data that is being processed by the system 100. By way of a non-limiting example, each kilobyte of data can correspond to one digital token. As can be understood, other volumes of data can correspond to a single digital token. In alternate implementations, digital tokens can also represent complexity of data operations that are being performed by the system 100 in place of and/or in addition to the data volume. In some implementations, the digital tokens can be representative of digital mass particles, i.e., a representation of a particular amount of digital mass (e.g., 1 GB of digital data).

The system 100 can then implement the digital engine 112 (e.g., a processor, a network of processors, etc.) to transform the digital mass into a predetermined object (e.g., a work of art, jewelry, an architectural design, a vehicle, etc.). The digital engine 112 can operate in one or more modes: an automatic mode, a custom algorithm mode, and a manual mode. Any data that may be used by the digital engine 112 can be streamed to it from the cloud storage 106.

The digital engine 112 can be configured to include a plurality of functions that are able to transform the digital mass (or digital mass particles) that it receives into a predetermined state or being (e.g., as part of a global state of the entire digital mass that can be stored in the cloud 106). The data contained in points (e.g., digital mass particles) in the point clouds (as shown in FIG. 2) of the digital mass can be individually and/or collectively selected, transported, transformed, manipulated, deleted, purged, replaced, etc. (e.g., this can be similar to chiseling a block of marble, where the block can be chiseled in individual sections, specific points, larger sections, etc.). In some implementations, the digital data input can be scaled to a certain number of digital mass particles, e.g., 1,000,000 GB data input can be scaled to correspond to 100,000 digital mass particles. This means that a collection of digital mass particles can be denser or sparse (where each particle can correspond to a larger or smaller size input data), which can affect how a final object is generated. Further, data can be added to the existing digital mass to generate additional structures, which in turn, allow generation of further features of an object.

The automatic mode can include a collection of specific functions or computing tools that affect how portions of the digital mass, and in particular, point clouds, are selected, modified, deleted, etc., which in turn, affects an output of the digital engine 112. In the automatic mode, a user of the system 100 typically does not have creative control of how the digital mass is manipulated. For example, the automatic mode may predetermine that a particular group of point clouds in the digital mass is selected, whereby a certain number of point clouds from that group may be moved to a different location to be connected with another group of point clouds, another group of point clouds may be deleted, etc., to thereby generate a desired shape. In some implementations, various properties of point clouds, e.g., a number of points in point clouds, their density, distances between points in the point clouds, the number of data points in a data cloud, etc. can affect how the points in the point clouds are manipulated. The selection/manipulation/deletion/etc. of points in the point clouds can be predetermined on the object that is being eventually generated. For example, a sculpture object can call for a different set of functionalities to affect points in the point clouds in the digital mass (e.g., some points in the point clouds may need to be manipulated to define sculpture's shape, curvatures, dimensions, etc.), than a building object (e.g., some points in the point clouds may need to be manipulated to define building's walls, windows, height, width, etc.).

In some implementations, the automatic mode can implement various aspects of machine learning, deep learning, etc. to determine the best possible approach to creation of a particular object. Such techniques can allow the system 100 to learn (e.g., by creating and using particular data models, algorithms, etc.) how points in point clouds can be manipulated based on previous object creations.

Further, any data, regardless of its origin, original format, characteristics, etc. can be used to generate any desired object. The system 100 is able to "harvest" the data from the cloud storage 106, apply a set of predetermined computing tools (e.g., selected based on the final desired object) to manipulate point clouds in the "harvested" data, and generate the object that was desired.

The custom algorithm mode can be a combination of the automatic mode and the manual mode. In this mode, certain functionalities that cause manipulation of a specific set of point clouds may be predetermined. Whereas, the user may manipulate other points in point clouds using various computing tools (including any custom computing tools that the user may create). This can be akin to using different sets of tools to perform a more targeted chiseling of a marble block. Custom algorithm mode can allow the user more creative control with respect to the object creation process as well as the final object that is created.

The manual mode allows the user to have a full control over the data that is being manipulated, the computing tools that are being used, the order in which tools are used/implemented, etc. as well as what the eventual object will look like. In this mode, the user can manipulate (e.g., select, modify, delete, duplicate, transport to a different location, etc.) each point in point cloud individually or in groups. The user can use customized computing tools for each such point in point cloud and/or group of points and/or point clouds. In some implementations, the manual mode and/or automatic mode can also implement various aspects of machine learning, deep learning, etc. to determine the best possible approach to creation of a particular object. Such techniques can allow the system 100 to learn (e.g., by creating and using particular data models, algorithms, etc.) how points in point clouds can be manipulated based on previous object creations. For example, machine learning, artificial intelligence, etc. can be used to ascertain constant A in equation (1) as well as to learn about the depth of manipulation that may be performed in connection with constant A (e.g., manual manipulation that may be performed, such as, in a manual mode).

In some implementations, the digital engine 112 can be configured to use various processing parameters that may be associated with computing tools that are applied to the point clouds in the digital mass. The processing parameters can be individually stored in the cloud storage along with the output of the digital engine 112.

As a result of the manipulation of the data in the point clouds by the digital engine 112, the engine 112 can generate a set of instructions and parameters that can be used to create a desired object (e.g., a work of art, a sculpture, a building, a vehicle, jewelry, etc.). The object can be created using these instructions/parameters by applying them to any input data that may be provided. The set of instructions/parameters can also be stored along with or separately from the input data. The input data as well as any instructions/parameters can be tracked using a blockchain ledger, which can be used to trace origin of the input data to input data's original source as well as manipulations that have been performed by the digital engine 112, etc.

In some implementations, the digital mass particles, by virtue of having a certain "mass", can be assigned a certain amount of "energy". Such energy can be determined based on at least the following equation:

$$Y_e = \frac{A}{2*X_1} * M \qquad (1)$$

where $Y_e$ can corresponds to an "energy" of an object being generated using digital mass particle(s); A can be a constant that can be selected based on an object being generated; $X_1$ can be a digital mass particle (or a new digital mass particle); and M can correspond to a digital mass.

In some implementations, selection of a particular constant A can greatly affect the eventual object that is being generated even if the other factors of the equation (1) remain the same. Moreover, if the constant A remains the same but other factors (e.g., amount of digital mass) is different, the amount of energy generated as well as eventual object that is being generated can be vastly different.

The transformation map module 114 can be configured to store the set of instructions and/or parameters as a transformation map in the cloud storage 106. In some implementations, the transformation map generated by the module 114 can be indicative of all manipulations that have been performed on the digital mass (e.g., the map can be stored in a .daformat format). The transformation map can be stored in the cloud storage 106 and can be accessed at any time, such as for the purposes of generating a particular object or a modification of the previously created object.

The catalog module 116 can include catalog(s) of all transformation maps that have been generated by the system 100. Any new transformation maps that are generated can be added to the catalog(s). The catalog(s) contained in the catalog module 116 can be organized in any desired way, e.g., by the type of objects (e.g., art works, sculptures, jewelry, architectural designs, vehicles, multimedia objects, virtual reality objects, etc.). The catalog(s) can be searchable and can be accessed using commonly known Internet search engines, video streaming platforms, Internet shopping platforms, etc. Various controllers can be used to navigate the catalog(s), content, and/or assist users in creation of unique objects (including experiential objects).

In some implementations, the system 100 can the include one or more components that can use the transformation maps listed in the catalog(s) to initiate conversion of the input data into digital object format for manipulation by the digital art engine and then into one or more predetermined data formats that can be suitable for presentation, such as via one or more output modules 118. For example, the presentation can be in a format suitable for a 3D printer (e.g., for generation of a physical object) 119a, a projector 119b, a virtual/augmented reality device 119c, a video game 119d, and/or any other formats/devices 119e.

In some implementations, the current subject matter can provide for one or more unique processes and/or algorithmic aspects including the digital object/art format (DAF/DOF), the software modules that convert conventional data into the DAF, the digital engine, the software modules that can convert the digital object/art mass back into various data formats for production and distribution, and the integration of experiential, environmental and emotional data into the digital art creation process via data.

FIGS. 3a-f illustrate some exemplary stages 301-311 of transformation of data as represented by point clouds to generate an object (e.g., a virtual sculpture of a head). FIGS. 4a-g, illustrate some exemplary stages 401-413 of transformations to generate the object shown in FIGS. 3a-f.

Figure 5:
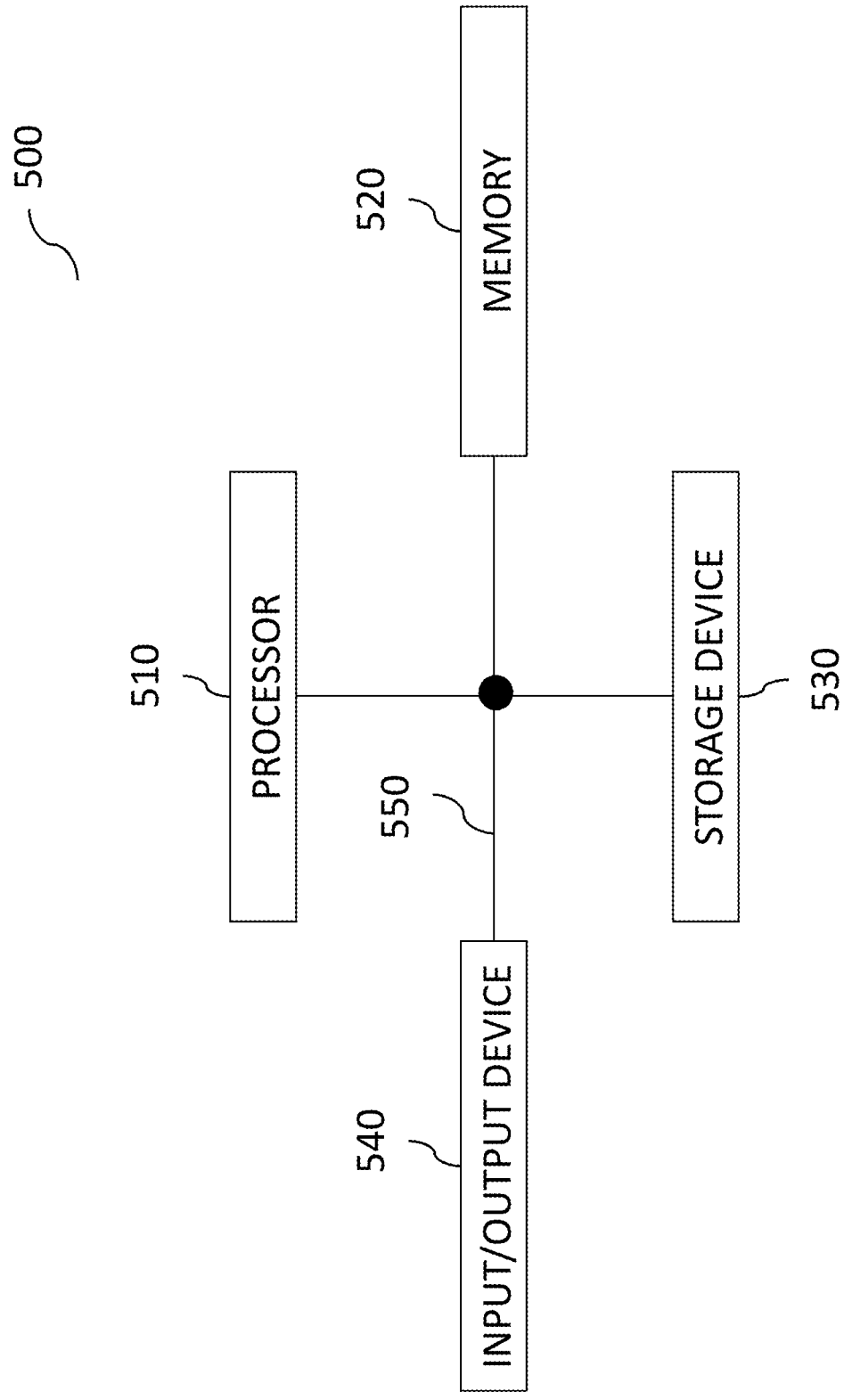
FIG. 5 illustrates an exemplary system, according to some implementations of the current subject matter.

In some implementations, the current subject matter can be configured to be implemented in a system 500, as shown in FIG. 5. The system 500 can include a processor 510, a memory 520, a storage device 530, and an input/output device 540. Each of the components 510, 520, 530 and 540 can be interconnected using a system bus 550. The processor 510 can be configured to process instructions for execution within the system 500. In some implementations, the processor 510 can be a single-threaded processor. In alternate implementations, the processor 510 can be a multi-threaded processor. The processor 510 can be further configured to process instructions stored in the memory 520 or on the storage device 530, including receiving or sending information through the input/output device 540. The memory 520 can store information within the system 500. In some implementations, the memory 520 can be a computer-readable medium. In alternate implementations, the memory 520 can be a volatile memory unit. In yet some implementations, the memory 520 can be a non-volatile memory unit. The storage device 530 can be capable of providing mass storage for the system 500. In some implementations, the storage device 530 can be a computer-readable medium. In alternate implementations, the storage device 530 can be a floppy disk device, a hard disk device, an optical disk device, a tape device, non-volatile solid state memory, or any other type of storage device. The input/output device 540 can be configured to provide input/output operations for the system 500. In some implementations, the input/output device 540 can include a keyboard and/or pointing device. In alternate implementations, the input/output device 540 can include a display unit for displaying graphical user interfaces.

Figure 6:
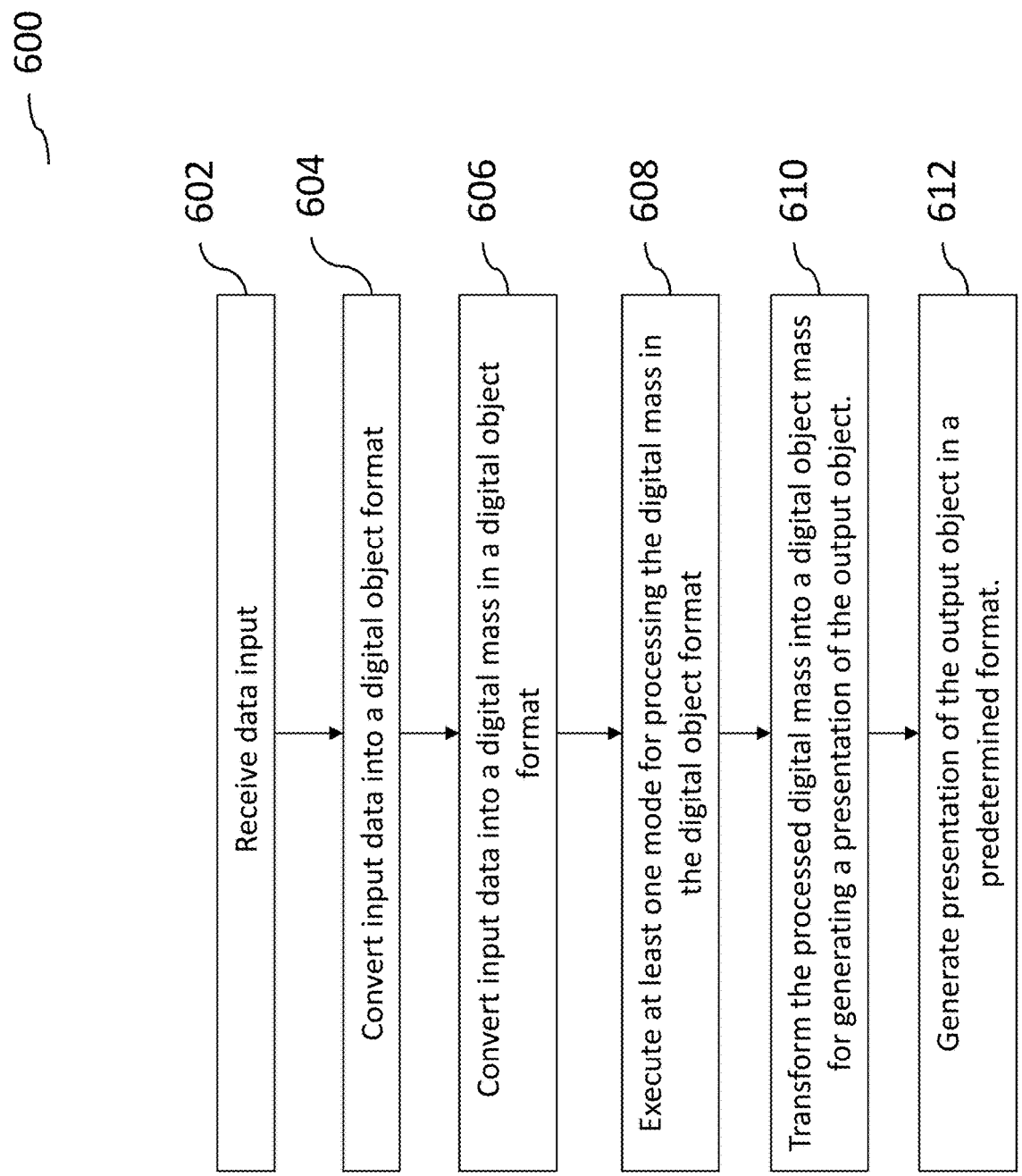
FIG. 6 illustrates an exemplary method, according to some implementations of the current subject matter.

FIG. 6 illustrates an exemplary method 600, according to some implementations of the current subject matter. At 602, a data input is received. As stated above, the data input can be any data that can be used to form an output object, environmental data (e.g., IoT), sensor data, etc. At 604, the input data is converted into a digital object format. At 606, the converted input data can be further converted into a digital mass in a digital object format wherein the converted data input includes a mapping indicative of an organization of a plurality of data points in the data input. At 608, at least one mode for processing the digital mass in the digital object format can be executed to process the digital mass in the digital object format. The processing includes at least one manipulation of at least one data point in the plurality of data points in the data input. At 610, the processed digital mass can then be transformed into a digital object mass for generating a presentation of the output object. The digital object mass can include at least one instruction and at least one parameter for generating of the object. At 612, presentation of the output object is generated in a predetermined format.

In some implementations, the current subject matter can include one or more of the following optional features. The data input can include at least one of the following: an image, a video, an audio file, a text file, an input command, a query, a function call, data obtained from the Internet of Things (IoT), sensor data, and any combination thereof.

In some implementations the method can also include scrambling the received data input, encrypting the received data input, and storing the encrypted scrambled data input in at least one cloud storage location. The converted data input and the mapping can be stored in the at least one cloud storage location. At least one token can be assigned to at least one portion of the converted data input, the token being indicative of a size of the at least one portion of the converted data input. At least one data point can correspond to a point cloud in the plurality of point clouds. The manipulation of at least one point cloud in the plurality of point clouds can includes at least one of the following: selection, transporting, transforming, deletion, purging, replacement, etc. of the at least one point cloud and any combination thereof.

In some implementations, the predetermined format of the object can include at least one of the following: a 3D printer format, a projector format, a virtual/augmented reality device format, a video game format, and any combination thereof. The object can include at least one of the following: a physical object, a virtual object, and any combination thereof.

In some implementations, the cloud storage location can store at least one blockchain ledger configured to include a correlation of the received data input, the converted data input, the processed data input and the mapping, the at least one instruction and at least one parameter for generating of the object, and the generated representation of the object.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method for generation of an object, comprising:
    receiving a data input;
    scrambling the received data input;
    encrypting the received data input; and
    storing the encrypted scrambled data input in at least one cloud storage location;
    converting the data input into a digital object format, wherein the converted data input includes a mapping indicative of an organization of a plurality of data points in the data input, wherein the converted data input and the mapping are stored in the at least one cloud storage location;
    processing the converted data input based on the mapping, wherein the processing includes at least one manipulation of at least one data point in the plurality of data points in the data input;
    transforming the processed data input into a digital object mass containing at least one instruction and at least one parameter for generating of the object; and
    generating a representation of the object in a predetermined format based on the transformed processed data;
    wherein the at least one cloud storage location stores at least one blockchain ledger configured to include a correlation of the received data input, the converted data input, the processed data input and the mapping, the at least one instruction and at least one parameter for generating of the object, and the generated representation of the object.

2. The method according to claim 1, wherein the data input includes at least one of the following: an image, a video, an audio file, a text file, an input command, a query, a function call, data obtained from the Internet of Things (IoT), sensor data, and any combination thereof.

3. The method according to claim 1, wherein at least one token is assigned to at least one portion of the converted data input, the token being indicative of a size of the at least one portion of the converted data input.

4. The method according to claim 1, wherein at least one data point corresponds to a point cloud in the plurality of point clouds;
    wherein manipulation of at least one point cloud in the plurality of point clouds includes at least one of the following: selection, transporting, transforming, deletion, purging, replacement of the at least one point cloud and any combination thereof.

5. The method according to claim 1, wherein the predetermined format of the object can include at least one of the following: a 3D printer format, a projector format, a virtual/augmented reality device format, a video game format, and any combination thereof;
    wherein the object includes at least one of the following: a physical object, a virtual object, and any combination thereof.

6. A system for generation of an object, comprising:
    at least one programmable processor; and
    a machine-readable medium storing instructions that, when executed by the at least one programmable processor, cause the at least one programmable processor to perform operations comprising:
    receiving a data input;
    scrambling the received data input;
    encrypting the received data input; and
    storing the encrypted scrambled data input in at least one cloud storage location;
    converting the data input into a digital object format, wherein the converted data input includes a mapping indicative of an organization of a plurality of data points in the data input, wherein the converted data input and the mapping are stored in the at least one cloud storage location;
    processing the converted data input based on the mapping, wherein the processing includes at least one manipulation of at least one data point in the plurality of data points in the data input;
    transforming the processed data input into a digital object mass containing at least one instruction and at least one parameter for generating of the object; and
    generating a representation of the object in a predetermined format based on the transformed processed data;
    wherein the at least one cloud storage location stores at least one blockchain ledger configured to include a correlation of the received data input, the converted data input, the processed data input and the mapping, the at least one instruction and at least one parameter for generating of the object, and the generated representation of the object.

7. The system according to claim 6, wherein the data input includes at least one of the following: an image, a video, an audio file, a text file, an input command, a query, a function call, data obtained from the Internet of Things (IoT), sensor data, and any combination thereof.

8. The system according to claim 6, wherein at least one token is assigned to at least one portion of the converted data input, the token being indicative of a size of the at least one portion of the converted data input.

9. The system according to claim 6, wherein at least one data point corresponds to a point cloud in the plurality of point clouds;
    wherein manipulation of at least one point cloud in the plurality of point clouds includes at least one of the following: selection, transporting, transforming, deletion, purging, replacement of the at least one point cloud and any combination thereof.

10. The system according to claim 6, wherein the predetermined format of the object can include at least one of the following: a 3D printer format, a projector format, a virtual/augmented reality device format, a video game format, and any combination thereof;
wherein the object includes at least one of the following: a physical object, a virtual object, and any combination thereof.

11. A computer program product for generation of an object comprising a non-transitory machine-readable medium storing instructions that, when executed by at least one programmable processor, cause the at least one programmable processor to perform operations comprising:
receiving a data input;
scrambling the received data input;
encrypting the received data input; and
storing the encrypted scrambled data input in at least one cloud storage location;
converting the data input into a digital object format, wherein the converted data input includes a mapping indicative of an organization of a plurality of data points in the data input, wherein the converted data input and the mapping are stored in the at least one cloud storage location;
processing the converted data input based on the mapping, wherein the processing includes at least one manipulation of at least one data point in the plurality of data points in the data input;
transforming the processed data input into a digital object mass containing at least one instruction and at least one parameter for generating of the object; and
generating a representation of the object in a predetermined format based on the transformed processed data;
wherein the at least one cloud storage location stores at least one blockchain ledger configured to include a correlation of the received data input, the converted data input, the processed data input and the mapping, the at least one instruction and at least one parameter for generating of the object, and the generated representation of the object.

12. The computer program product according to claim 11, wherein the data input includes at least one of the following: an image, a video, an audio file, a text file, an input command, a query, a function call, data obtained from the Internet of Things (IoT), sensor data, and any combination thereof.

13. The computer program product according to claim 11, wherein at least one token is assigned to at least one portion of the converted data input, the token being indicative of a size of the at least one portion of the converted data input.

14. The computer program product according to claim 11, wherein at least one data point corresponds to a point cloud in the plurality of point clouds;
wherein manipulation of at least one point cloud in the plurality of point clouds includes at least one of the following: selection, transporting, transforming, deletion, purging, replacement of the at least one point cloud and any combination thereof.

15. The computer program product according to claim 11, wherein the predetermined format of the object can include at least one of the following: a 3D printer format, a projector format, a virtual/augmented reality device format, a video game format, and any combination thereof;
wherein the object includes at least one of the following: a physical object, a virtual object, and any combination thereof.

* * * * *